Nov. 21, 1939.     Y. MATUSITA     2,180,991
ELECTRIC VALVE CONVERTING SYSTEM
Filed Nov. 9, 1938     2 Sheets-Sheet 1

Inventor:
Yosio Matusita,
by Harry E. Dunham
His Attorney.

Nov. 21, 1939.   Y. MATUSITA   2,180,991
ELECTRIC VALVE CONVERTING SYSTEM
Filed Nov. 9, 1938   2 Sheets—Sheet 2

Inventor:
Yosio Matusita,
by Harry E. Dunham
His Attorney.

UNITED STATES PATENT OFFICE 2,180,991

ELECTRIC VALVE CONVERTING SYSTEM

Yosio Matusita, Yokohama, Japan, assignor to General Electric Company, a corporation of New York Application November 9, 1938, Serial No. 239,722
In Japan December 20, 1937

8 Claims. (Cl. 175—363)

My invention relates to electric valve converting systems, and more particularly to such systems for supplying energy from an alternating current circuit to a direct current load circuit.

In electric valve converting and rectifying systems it has been common to use a plurality of phase networks, the mid or neutral points of which have been interconnected by means of inductive windings which have also been called interphase transformers. Such inductive windings in the instance of rectifying systems have a voltage which is a function of the load on the rectifier at light load values and which approaches a substantially constant voltage at the heavier load values. It is frequently desired to provide an electric valve rectifying system wherein at light load values the voltage output of the rectifier does not drop appreciably. In accordance with my invention means are provided responsive to the voltage appearing across the interphase transformer for controlling the phase of the alternating potential supplied to the control grids or electrodes thereby to maintain a substantially constant voltage on the direct current load circuit from a light load or no load condition to a full load condition.

It is, therefore, an object of my invention to provide an improved electric valve converting system for transferring energy from an alternating current circuit to a direct current circuit.

Another object of my invention is to provide an improved electric valve converting system for transferring energy from an alternating current circuit to a direct current load circuit which will have a substantially constant voltage output characteristic from no load values to full load values.

Still another object of my invention is to provide an improved electric valve rectifying system having means responsive to a change in potential across the interphase transformer for controlling the electric valve so as to produce a relatively constant voltage output characteristic.

Figure 1:
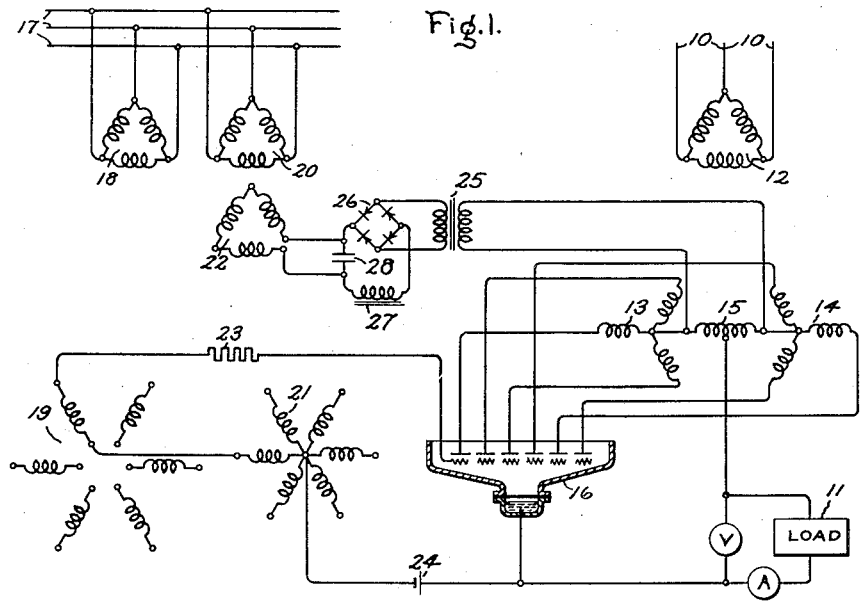
Figure 2:
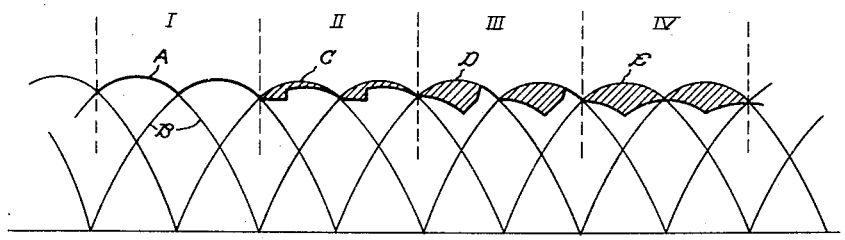
Figure 3:
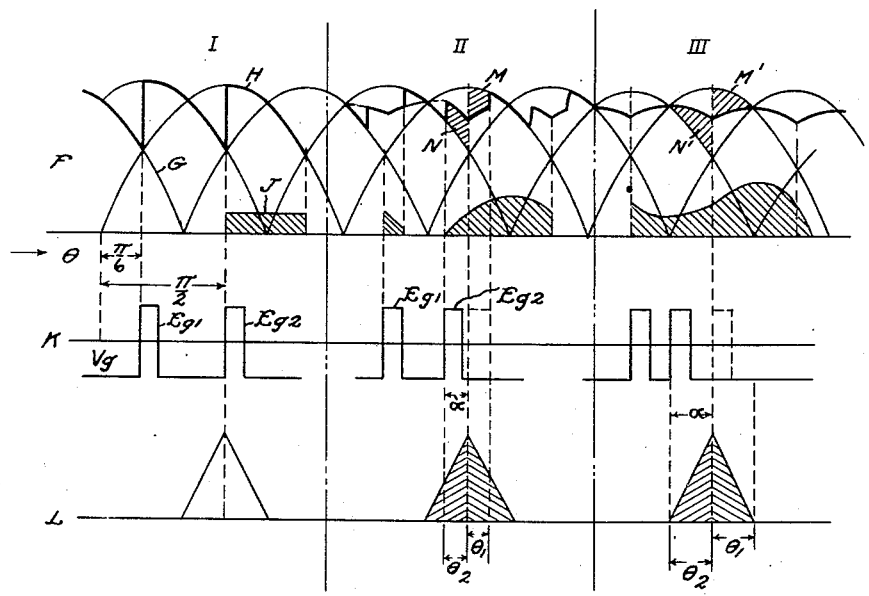
Figure 4:
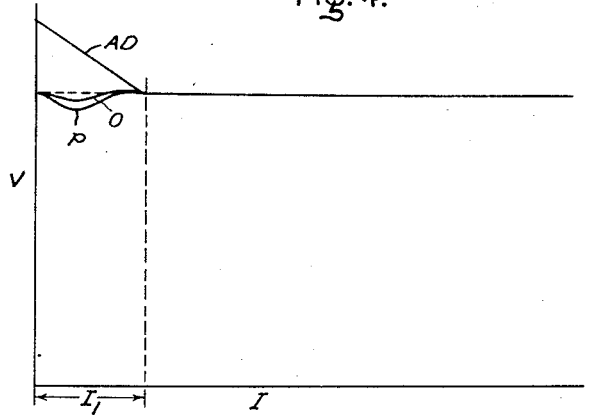

For a better understanding of my invention, together with other and further objects thereof, reference may be had to the following description taken in connection with the accompanying drawings in which Fig. 1 shows an arrangement embodying my invention, and Figs. 2, 3 and 4 are explanatory of the manner of operation of my invention.

Referring more particularly to Fig. 1 of the drawings, there is shown an arrangement embodying my invention for transferring power from an alternating current supply circuit 10 to a direct current load circuit 11. This includes an electric valve converting apparatus comprising a transformer having a primary winding 12 connected to the alternating current circuit 10 and two secondary windings 13 and 14 the neutral points of which are interconnected by an inductive winding or interphase transformer 15. The outer extremities of each of the phase windings of the secondary networks 13 and 14 are connected to one of the anodes of an electric arc discharge device 16, the cathode of which is connected to one side of the load circuit 11. While for the purposes of illustration the electric discharge device 16 has been shown as being of the type comprising a plurality of anodes each provided with a control grid enclosed within an envelope and having a single cathode, it of course will be apparent that any other device commonly known in the art may be utilized although it is preferable to use electric valve means of the type having an anode, a cathode and a control grid or starting electrode enclosed within an envelope containing an ionizable medium. The midpoint of the interphase inductive winding 15 is connected to one side of the direct current load 11. The conductivities of the various anodes of the electric valve means 16 are controlled by the respective grids thereof which are energized from a control circuit including an alternating current supply circuit 17 which may, if desired, be energized from the alternating current circuit 10. The alternating current circuit 17 is arranged to energize two transformers which are preferably of the saturable type so that peaked voltages or voltages having a relatively steep wave front are produced thereby. One of the transformers comprises a primary winding 18 and a secondary winding 19, whereas the other transformer comprises a primary winding 20, a secondary winding 21 and a direct current saturating winding 22. Each of the windings of the transformer secondary network 19 is connected in series with one of the windings of the transformer secondary network 21 so that there is a phase difference between the voltages supplied by the respective secondary windings. For the purposes of illustration one of these windings has been shown connected to one of the control electrodes or grids through a suitable current limiting resistor 23 and the common biasing source 24 which is connected between the neutral point of the transformer secondary network 21 and the cathode of the electric discharge means 16. In accordance with my invention the degree of saturation of one of the transformers is controlled in accordance with the potential appearing across the interphase transformer 15. This is accomplished by connecting the transformer 25 across the interphase transformer 15 and by rectifying the output of the secondary winding of this transformer by a bridge rectifier 26 the output of which is filtered by an inductor 27 and a capacitor 28. The degree of saturation produced by the saturating winding 22 controls the phase of the voltage supplied by the secondary winding 21 thereby controlling the moment of ignition of the various anodes of the electric discharge device 16. While a specific form of control transformer and means for controlling the saturation thereof has been disclosed for the purposes of illustration, it of course will be apparent to those skilled in the art that other means may be utilized to perform the same function without departing from my invention in its broader aspects.

The operation of the system disclosed in Fig. 1 will become more apparent by reference to Fig. 2 wherein there is shown the operating characteristics of the ordinary electric valve converting or rectifying apparatus which is not provided with the features of my invention. The wave forms shown at I, II, III and IV show the operation of the rectifier as the load is increased gradually from no load value to full load value. At the no load value the interphase transformer is substantially ineffective and the windings 13 and 14 operate as a six-phase rectifier. During the intermediate portions of the operation as shown in II and III the rectifier tends to operate partially as a six-phase rectifier and as a three-phase parallel operated rectifier. In the period IV the operation is that of a double three-phase parallel operated rectifier. The voltage output of the rectifier is shown by the solid line A whereas the light line sinusoidal waves B illustrate the alternating current voltages of the various phases. The cross-hatched sections C, D and E occurring in periods II, III and IV show the voltage drop in each range of operation which in period IV amounts to approximately 15.4 per cent of the voltage. This operation corresponds to the current load characteristic AD shown in Fig. 4.

In contrast to this operation Fig. 3 illustrates the manner in which the electric valve converting apparatus operates in accordance with my invention. In the curve F, periods I, II and III indicate periods of operation at no load, intermediate load and substantially full load, respectively. The light curves G illustrate the anode voltages, the heavy line curve H illustrates the rectifier output voltage and the cross-section portions J the anode current. Curve K shows the grid or control voltage and curve L shows the voltage appearing across the interphase transformer. In curve K, $V_g$ represents the negative bias such as is applied by the source 24 and $E_{g1}$ and $E_{g2}$ are theoretical representations of the voltages supplied by the phase windings of the transformer secondary networks 19 and 21, respectively. The voltage $E_{g1}$ occurs at a position where the phase $\theta$ is $$\frac{\pi}{6}$$

and the voltage $E_{g2}$ occurs where the phase angle is $$\frac{\pi}{2}$$

under no load conditions as shown in period I so that the voltage $E_{g2}$ may be advanced by an angle $\alpha$ with an increase in load. Since the interphase transformer voltage is substantially zero in period I the output curve H shows the rectified voltage wave form. Under the operating conditions shown in period II it will be seen that the cross-hatching in curve L represents a voltage appearing across the interphase transformer. This causes the grid control voltage $E_{g2}$ to be advanced by an angle $\alpha$. When this angle $\alpha$ equals $\theta_2$ a balanced condition is obtained since $\theta_2$ is equal to $\theta_1$ and the drop in voltage due to the overlap of $\theta_1$ as indicated by the cross-hatched area M is compensated for by the increase in voltage due to the angle $\theta_1$ which is shown by the cross-hatched area N. Thus the resultant direct current voltage in periods I and II is substantially equal. In Fig. 3 it will again be seen that the cross-hatched areas M' and N' are substantially equal and hence the output voltage is substantially constant. While theoretically the voltage remains substantially constant it has been found that practically it is somewhat difficult to maintain the condition where $\theta_1$ is equal to $\theta_2$ so that the voltage characteristics may in practice actually appear either as curves O or P in Fig. 4. This variation from the theoretical constant voltage, however, is so slight that the arrangement shown automatically maintains a substantially constant output voltage throughout the range of operation.

While I have shown and described my invention in connection with a particular embodiment it will, of course, be understood that I do not wish to be limited thereto, since it is apparent that the principles herein disclosed are susceptible of numerous other modifications and other circuit arrangements may be employed without departing from the spirit and scope of my invention as set forth in the appended claims.

What I claim as new and desire to secure by Letters Patent of the United States is:

1. In combination, a source of alternating current, a direct current load circuit, an electric valve converting system interconnecting said circuits, said system including a plurality of polyphase networks interconnected by an interphase transformer and a controlled electric discharge apparatus, and means for controlling the conductivity of said electric discharge apparatus in accordance with the voltage appearing across said interphase transformer.

2. In combination, a source of alternating current, a direct current load circuit, an electric valve converting system interconnecting said circuits, said system including a plurality of polyphase networks interconnected by an inductive winding, an electric discharge apparatus interconnecting said load circuit and said polyphase networks, and means for retarding the moments of ignition of said electric discharge apparatus in accordance with the voltage appearing across said inductive winding.

3. In combination, a source of alternating current, a direct current load circuit, an electric valve converting system interconnecting said circuits, said system including a plurality of polyphase networks interconnected by an inductive winding, a controlled electric discharge apparatus, a control circuit for said apparatus comprising means for supplying thereto two phase displaced control voltages, and means for controlling the phase of one of said voltages in accordance with the voltage appearing across said inductive winding.

4. In combination, a source of alternating current, a direct current load circuit, an electric valve converting system interconnecting said circuits, said system including a plurality of polyphase networks interconnected by an interphase transformer, electric valve means associated therewith, a control circuit including a source of control potential for said means, and means for controlling the phase of said control potential in accordance with the voltage appearing across said interphase transformer.

5. In combination, a source of alternating current, a direct current load circuit, an electric valve converting system interconnecting said circuits, said system including a plurality of polyphase networks interconnected by an inductive winding, an electric valve means associated with said polyphase network, a control circuit for said electric valve means including a saturable transformer, and means for saturating said transformer in accordance with the voltage appearing across said inductive winding.

6. In combination, a source of alternating current, a direct current load circuit, an electric valve converting system interconnecting said circuits, said system including a plurality of polyphase networks interconnected by an inductive winding, an electric discharge apparatus associated with said polyphase networks and said load circuit, a control circuit for said electric discharge apparatus including a plurality of transformers having their secondary windings connected in series so as to produce control voltage components having a predetermined phase difference, and means for varying said phase relations in accordance with the voltage appearing across said inductive winding.

7. In combination, a source of alternating current, a direct current load circuit, an electric valve converting system interconnecting said circuits, said system including a plurality of polyphase networks interconnected by an inductive winding, means for deriving a direct current component proportional to the voltage appearing across said inductive winding, and means for controlling the conductivity of said electric valve converting system in accordance with said direct current component.

8. In combination, a source of alternating current, a direct current load circuit, an electric valve converting system interconnecting said circuits, said system including a plurality of polyphase networks interconnected by an inductive winding, an electric discharge valve means interconnecting said load circuit and said polyphase networks, a control circuit for said electric discharge apparatus including means responsive to the voltage appearing across said inductive winding for varying the conductivity of said electric discharge apparatus to produce a substantially constant voltage output.

YOSIO MATUSITA.